United States Patent
Lv et al.

(10) Patent No.: US 12,261,433 B2
(45) Date of Patent: Mar. 25, 2025

(54) METHOD AND SYSTEM FOR COLLABORATIVE REGULATION OF MULTI-COMPONENT POWER DISTRIBUTION NETWORK WITH HIGH PROPORTION OF DISTRIBUTED POWER SOURCES

(71) Applicant: SHANDONG UNIVERSITY, Shandong (CN)

(72) Inventors: Tianguang Lv, Jinan (CN); Molin An, Jinan (CN); Xueshan Han, Jinan (CN); Jian Chen, Jinan (CN); Shumin Sun, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 438 days.

(21) Appl. No.: 17/729,202

(22) Filed: Apr. 26, 2022

(65) Prior Publication Data
US 2023/0093345 A1    Mar. 23, 2023

(30) Foreign Application Priority Data
Sep. 13, 2021 (CN) .......................... 202111067640.0

(51) Int. Cl.
*H02J 3/00* (2006.01)
*G05B 6/02* (2006.01)
*G05B 13/04* (2006.01)

(52) U.S. Cl.
CPC .................. *H02J 3/00* (2013.01); *G05B 6/02* (2013.01); *G05B 13/042* (2013.01); *H02J 2203/20* (2020.01)

(58) Field of Classification Search
CPC .......... H02J 3/00; H02J 2203/20; Y04S 10/50
See application file for complete search history.

(56) References Cited

U.S. PATENT DOCUMENTS

| 4,870,421 A | * | 9/1989 | Peil | .......................... G05F 1/575 |
| | | | | 333/136 |
| 9,159,042 B2 | * | 10/2015 | Steven | ................... G06Q 10/06 |

(Continued)

FOREIGN PATENT DOCUMENTS

| CN | 108039711 A | 5/2018 |
| CN | 108494022 A | 9/2018 |

(Continued)

OTHER PUBLICATIONS

Tang, Yifan. "Power distribution system planning with reliability modeling and optimization." IEEE Transactions on Power Systems 11.1 (1996): 181-189. (Year: 1996).*

(Continued)

*Primary Examiner* — Robert E Fennema
*Assistant Examiner* — Vi N Tran
(74) *Attorney, Agent, or Firm* — Oliff PLC

(57) ABSTRACT

A method and system for regulating a multi-component power distribution network with high proportion of distributed power sources. The method includes: the distribution network regulation center acquiring user voltage information; the information and optimization model, performing iterative calculation of corresponding preset control objectives for the distribution network regulation center in the optimization model by a Lagrange algorithm, simultaneously controlling errors of the control objectives in the iterative calculation process by a Proportional-Integral-Differential (PID) algorithm, for acquiring a regulation signal of a user side local load, and sending the user side's local load regulation signal to the user side; and performing iterative calculation of control objectives based on the regulation signal of the local load and the calculation part of the optimization model user side, and simultaneously controlling errors of the control objectives in the iterative calculation process by the PID controller, to regulate the local load.

7 Claims, 3 Drawing Sheets

(56) References Cited

U.S. PATENT DOCUMENTS

| | | | | |
|---|---|---|---|---|
| 9,348,381 | B2* | 5/2016 | Khoo | H04L 67/10 |
| 9,742,411 | B1* | 8/2017 | Fan | G05F 1/66 |
| 10,148,092 | B2* | 12/2018 | Dall'Anese | H02J 3/06 |
| 10,734,821 | B2* | 8/2020 | Haj-Maharsi | H02J 3/32 |
| 11,387,651 | B2* | 7/2022 | Samaan | H02J 3/381 |
| 11,695,299 | B2* | 7/2023 | Xu | H02J 13/00032 700/286 |
| 11,728,653 | B2* | 8/2023 | Moghe | H02J 3/16 700/295 |
| 2014/0205283 | A1 | 7/2014 | Djordjevic et al. | |
| 2014/0316973 | A1* | 10/2014 | Steven | H02J 3/008 705/37 |
| 2021/0273492 | A1* | 9/2021 | Sherman | H02J 50/60 |

FOREIGN PATENT DOCUMENTS

| | | |
|---|---|---|
| CN | 110570108 A | 12/2019 |
| CN | 113098007 A | 7/2021 |

OTHER PUBLICATIONS

Ahmad, Jameel, Muhammad Tahir, and Sudip K. Mazumder. "Dynamic economic dispatch and transient control of distributed generators in a microgrid." IEEE Systems Journal 13.1 (2018): 802-812. (Year: 2018).*

Hao, Ran, et al. "Distributed piecewise approximation economic dispatch for regional power systems under non-ideal communication." Ieee Access 7 (2019): 45533-45543. (Year: 2019).*

Oct. 28, 2021 Office Action issued in Chinese Patent Application No. 202111067640.0.

Yeyong Li et al. "A Condition-Based Maintenance Approach to an Optimal Maintenance Strategy Considering Equipment Imperfect Maintenance Model". 5th International Conference on Electric Utility Deregulation and Restructuring and Power Technologies, Nov. 26-29, 2015, Changsha, China, pp. 1466-1471.

Tianguang Lv et al. "Interactive Energy Management of Networked Microgrids-Based Active Distribution System Considering Large-Scale Integration of Renewable Energy Resources". Applied Energy, 2016, vol. 163, pp. 408-422.

Tianguang Lü et al. "Behavioural Analysis and Optimal Operation of Active Distribution System With Multi-Microgrids". Chinese Society for Electrical Engineering, 2016, vol. 36, No. 1, pp. 122-132.

Ran Hao et al. "Distributed Piecewise Approximation Economic Dispatch for Regional Power Systems Under Non-Ideal Communication". IEEE Access, 2019, vol. 7, pp. 45533-45543.

Kaiyi Huang et al. "Challenges and Prospects of Regional Energy Network Demand Response Based On Energy Cell-Tissue Architecture". Power System Technology, 2019, vol. 43, No. 9, pp. 3149-3160.

* cited by examiner

METHOD AND SYSTEM FOR COLLABORATIVE REGULATION OF MULTI-COMPONENT POWER DISTRIBUTION NETWORK WITH HIGH PROPORTION OF DISTRIBUTED POWER SOURCES

TECHNICAL FIELD

The present invention belongs to the field of optimization and regulation of power system, and particularly relates to a method and system for collaborative regulation of a multi-component power distribution network with a high proportion of distributed power sources.

BACKGROUND

The statements in this section merely provide the background technical information relevant to this embodiment, and do not necessarily constitute the prior art.

With the development of modern power systems, more and more distributed power sources, such as wind power, photovoltaics and energy storage, are connected to power distribution networks. Accordingly, the power distribution network has changed from the original user-passive power energy consumption network to a multi-component power distribution network that can provide active power. The multi-component power distribution network refers to a power distribution network including a plurality of distributed power sources (distributed power generation, flexible loads, and energy storage). Therefore, it is necessary to design an appropriate regulation strategy and an appropriate optimization algorithm to regulate a multi-component power distribution network with a high proportion of distributed power sources. The regulation not only needs to consider the safe and stable operation of the power distribution network, but also needs to maximize the economic benefits of users.

In the regulation strategy of the multi-component power distribution network, the key is cost regulation. Using a reasonable optimization algorithm can increase the calculation speed and improve the optimization efficiency. In addition, since the regulation of the multi-component power distribution network involves the personal information of users, it is necessary to pay attention to the protection of the personal information of users. The personal information of users includes power consumption information of the users or economic information of the users. In the regulation of the multi-component power distribution network, it is necessary to reduce the acquisition of the personal information of users as much as possible while ensuring an accurate and fast calculation method. In this way, not only the personal information of users can be protected, but also the amount of information interaction in the regulation process can be reduced, thereby improving the efficiency of the entire regulation strategy. The existing studies on the optimization algorithms mainly focus on the speed and accuracy of calculation, but rarely consider the acquisition of the personal information of users in the regulation strategy. To reduce the acquisition of the personal information of users while ensuring the accuracy of the algorithm, a reasonable distributed algorithm needs to be designed, where the regulation center of the multi-component power distribution network and users can perform collaborative calculation. In this case, the parameter setting of the optimization algorithm is particularly important. An optimization algorithm with a specific parameter setting strategy and a specific parameter adjustment method can facilitate the parameter adjustment for the multi-component power distribution network and the users, to achieve an optimal calculation efficiency of the algorithm.

The inventor found that the existing regulation strategies of the multi-component power distribution network with a high proportion of distributed power sources cannot maximize the economic benefits of users while ensuring the safe and stable operation of the power distribution network. What's worse, in the existing regulation process of the multi-component power distribution network with a high proportion of distributed power sources, a large amount of user information is acquired, and the privacy of the user information cannot be protected.

SUMMARY

In order to solve the technical problems in the background, the present invention provides a method and system for collaborative regulation of a multi-component power distribution network with a high proportion of distributed power sources, which can achieve a balance between the economic benefits of users and the safe and stable operation of the power distribution network, and protect the privacy of user information. The multi-component power distribution network refers to a power distribution network including a plurality of distributed power sources (distributed power generation, flexible loads, and energy storage).

To achieve the foregoing objective, the present invention uses the following technical solutions:

A first aspect of this embodiment provides a method for collaborative regulation of a multi-component power distribution network with a high proportion of distributed power sources, including:

acquiring, by a regulation center of the multi-component power distribution network, user voltage information;

based on the user voltage information and an optimization model including a calculation part of a user side and a calculation part of the regulation center of the multi-component power distribution network, performing, by the regulation center of the multi-component power distribution network, iterative calculation of corresponding preset control objectives for the calculation part of the regulation center of the multi-component power distribution network in the optimization model by a Lagrange algorithm, simultaneously controlling errors of the corresponding preset control objectives in the iterative calculation process by a Proportional-Integral-Differential (PID) controller, so as to acquire a regulation signal of a local load of the user side, and sending the regulation signal of the local load of the user side to the user side; and performing, by the user side, iterative calculation of corresponding preset control objectives based on the regulation signal of the local load and the calculation part of the user side in the optimization model, and simultaneously controlling errors of the corresponding preset control objectives in the iterative calculation process by the PID controller, so as to regulate the local load to achieve the minimum economic cost and the minimum deviation between the voltage of the user side and the standard voltage of the multi-component power distribution network at the same time.

Further, the optimization model is:

$$\min_{p_i^t, q_i^t, o_i^t, \beta_i^t, \tilde{y}^t} \sum_{i \in N} C_i^t(p_i^t, q_i^t) + \gamma^t D^t(\tilde{y}^t)$$

where $\gamma^t \in R$, represents a coefficient of balance between the economic cost objective of a user and the voltage level objective of the multi-component power distribution network; $\alpha_i^t$ and $\beta_i^t$ respectively represent regulation signals of the active power and reactive power generated by the regulation center of the multi-component power distribution network to a distributed power source of the user at a time t; $p^t$ and $q^t$ represent vectors composed of the active power and reactive power injected by all nodes in the multi-component power distribution network; $\hat{v}^t$ represents a voltage level of the multi-component power distribution network; $C_i^t(p_i^t, q_i^t)$ represents the economic cost for the user side; and $D^t(\hat{v}^t)$ represents the voltage level objective of the multi-component power distribution network.

Further, constraint conditions of the optimization model include:

$$\hat{v}^t = Rp^t + Xq^t + a$$

$$\underline{v}^t \le \hat{v}^t \le \overline{v}^t$$

$$(p_i^t, q_i^t) = b_i^t(a_i^t, \beta_i^t) \forall i \in N$$

where $\overline{v}^t$ and $\overrightarrow{v}^t$ represent the upper and lower limit requirements of the voltage level of the multi-component power distribution network; R and X represent coefficient matrixes corresponding to active power and reactive power in an approximate linearized power flow calculation formula of the multi-component power distribution network, and a represents a constant; $b_i^t$ represents a function symbol; and i represents a node of the multi-component power distribution network, and N represents a node set.

Further, the local load includes the active power and reactive power injected by the distributed power sources to the multi-component power distribution network.

Further, the local load is regulated according to the regulation signal, the current user load and the economic cost of the local user.

Further, the stopping condition of the iterative calculation is: a calculation result converges to a predefined range.

Further, the stopping condition of the iterative calculation is: a maximum number of iterations preset before the calculation.

Further, the local load includes the active power and reactive power of the distributed power sources.

A second aspect of the present invention provides a system for collaborative regulation of a multi-component power distribution network with a high proportion of distributed power sources, including a regulation center of the multi-component power distribution network and a user side, where the regulation center of the multi-component power distribution network is configured to:

acquire user voltage information;

based on the user voltage information and an optimization model including a calculation part of the user side and a calculation part of the regulation center of the multi-component power distribution network, perform iterative calculation of corresponding preset control objectives for the calculation part of the regulation center of the multi-component power distribution network in the optimization model by a Lagrange algorithm, simultaneously control errors of the corresponding preset control objectives in the iterative calculation process by a PID controller, so as to acquire a regulation signal of a local load of the user side, and send the regulation signal of the local load of the user side to the user side;

the user side is configured to:

perform iterative calculation of corresponding preset control objectives based on the regulation signal of the local load and the calculation part of the user side in the optimization model, and simultaneously control errors of the corresponding preset control objectives in the iterative calculation process by the PID controller, so as to regulate the local load to achieve the minimum economic cost and the minimum deviation between the voltage of the user side and the standard voltage of the multi-component power distribution network at the same time.

Compared with the prior art, the beneficial effects of the present invention are:

(1) In order to solve the problem of regulation of a multi-component power distribution network with a high proportion of distributed power sources, the present invention provides an optimization model which can achieve a balance between the economic benefits of users and the safe and stable operation of the power distribution network. The model can not only minimize the economic cost of the user, but also control the voltage within a reasonable range, so that the multi-component power distribution network can operate stably to achieve a win-win situation.

(2) According to the "distributed" characteristic of the format of a Lagrange optimization algorithm, the present invention designs a regulation mode in which the users and the regulation center of the multi-component power distribution network collaboratively perform calculation. After the "user" acquires the regulation signal calculated by the "regulation center of the multi-component power distribution network", the user performs local calculation to adjust the value of the local load. The function information of the economic cost of the user and numerical information of the local load of the user that are used in the local calculation are only known to the user, and are not transmitted to the regulation center of the multi-component power distribution network. Therefore, the present invention can protect the privacy of the user to the greatest extent. The regulation center of the multi-component power distribution network only collects the voltage information in the multi-component power distribution network, completes the calculation of the regulation signal, and sends the regulation signal to the user side. This mode has the characteristics of less information interaction and high communication efficiency.

The advantages of the additional aspects of this embodiment will be partially given in the following description, and parts will be apparent from the following description, or will be understood through the practice of this embodiment.

BRIEF DESCRIPTION OF THE DRAWINGS

The accompanying drawings of the specification that form a part of this embodiment are used to provide a further understanding of this embodiment. The exemplary embodiments of this embodiment and the descriptions thereof are used to explain this embodiment, and do not constitute an improper limitation on this embodiment.

DETAILED DESCRIPTION

This embodiment will be further described below with reference to the accompanying drawings and embodiments.

It should be noted that the following detailed descriptions are all exemplary and are intended to provide a further description of this embodiment. Unless otherwise specified, all technical and scientific terms used herein have the same meanings as commonly understood by those skilled in the art in this embodiment.

It should be noted that the terms used herein are only used to describe specific embodiments, and are not intended to limit the exemplary embodiments according to this embodiment. As used herein, the singular form is intended to include the plural form, unless the context clearly indicates otherwise. In addition, it should be further understood that terms "include" and/or "comprise" used in this specification indicate that there are features, steps, operations, devices, assemblies, and/or combinations thereof.

Interpretation of Terms:

The PID-Lagrange Algorithm is Defined as:

The iterative calculation process of the optimization model is regarded as a "control process" that starts from an initial value and gradually finds an optimal value, the Lagrange algorithm is taken as a mathematical basis, and the PID controller in the control theory is used to control the error of each of the control objectives in the above iterative calculation process, thereby forming the PID-Lagrange algorithm.

Embodiment 1

In a specific implementation: this embodiment establishes an optimization model for a multi-component power distribution network with a high proportion of distributed power sources, aiming at the minimum economic cost and the minimum deviation between the voltage of a user side and the standard voltage.

In this embodiment, according to the iterative calculation format of a Lagrange multiplier method, the solving process of the optimization model is subtly decomposed, so as to form a collaborative optimization strategy for decentralized calculation of optimization objectives. A regulation center of the multi-component power distribution network and a user respectively undertake a part of the calculation work, and under the condition of acquiring user information as less as possible and protecting the user privacy, the regulation center of the multi-component power distribution network completes the calculation of regulation objectives together with the user, thereby greatly improving the efficiency.

Figure 1:
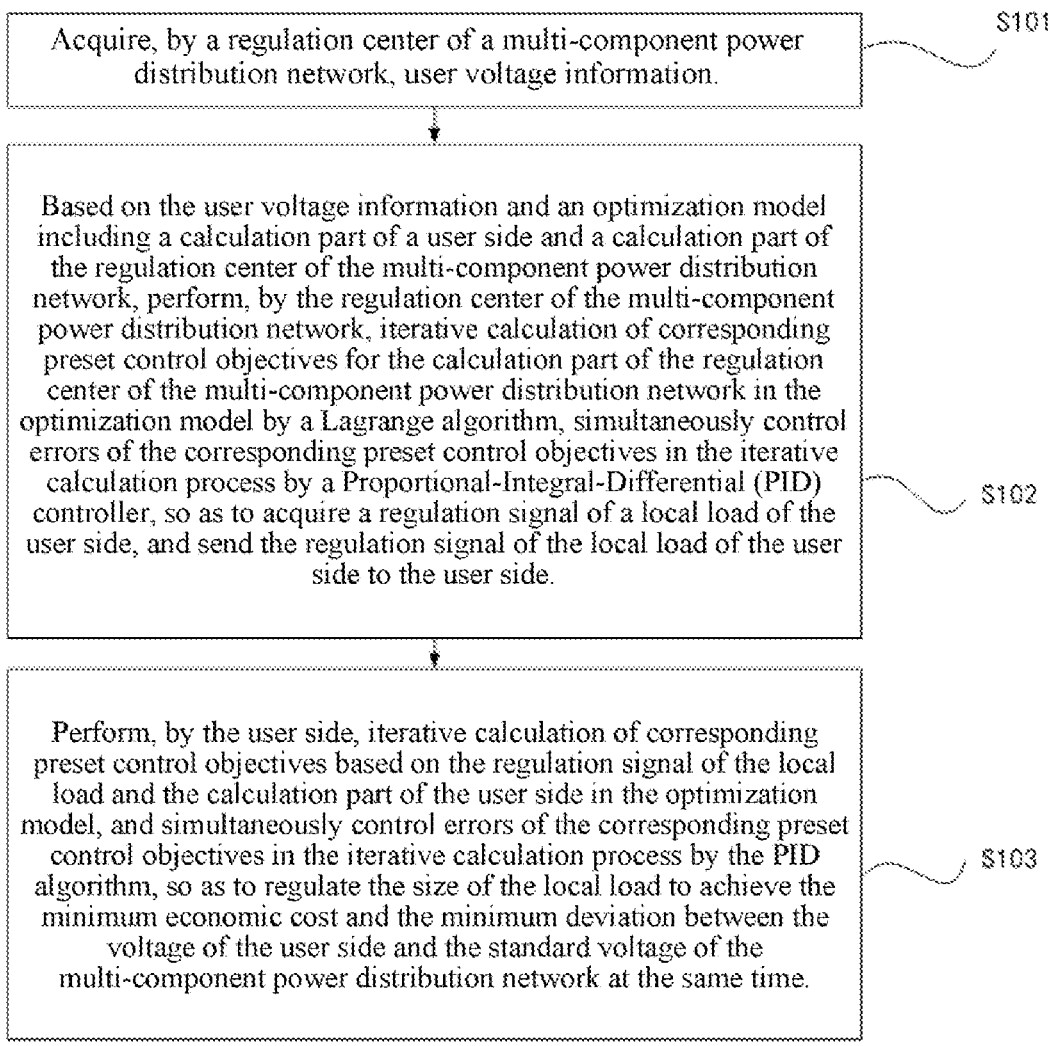
FIG. 1 is a flowchart of a method for collaborative regulation of a multi-component power distribution network with a high proportion of distributed power sources in an embodiment of the present invention.

In order to solve the problems of parameter setting and adjustment in the solving process of the optimization model, this embodiment adopts an innovative PID-Lagrange algorithm for calculation. This algorithm improves the Lagrange algorithm from the perspective of the control system theory, and uses a PID controller to control the solving process, so that algorithm parameters have control significance, the user can adjust the parameters conveniently, the optimization calculation speed is increased, and the cost of information transmission and communication in the optimization process is reduced. Referring to FIG. 1, this embodiment provides a method for collaborative regulation of a multi-component power distribution network with a high proportion of distributed power sources, including:

S101: user voltage information is acquired by a regulation center of the multi-component power distribution network;

S102: based on the user voltage information and an optimization model including a calculation part of a user side and a calculation part of the regulation center of the multi-component power distribution network, iterative calculation of corresponding preset control objectives is performed by the regulation center of the multi-component power distribution network for the calculation part of the regulation center of the multi-component power distribution network in the optimization model by a Lagrange algorithm, simultaneously errors of the corresponding preset control objectives in the iterative calculation process are controlled by a PID controller, so as to acquire a regulation signal of a local load of the user side, and the regulation signal of the local load of the user side is sent to the user side; and S103: iterative calculation of corresponding preset control objectives is performed by the user side based on the regulation signal of the local load and the calculation part of the user side in the optimization model, and simultaneously errors of the corresponding preset control objectives in the iterative calculation process are controlled by the PID controller, so as to regulate the local load to achieve the minimum economic cost and the minimum deviation between the voltage of the user side and the standard voltage of the multi-component power distribution network at the same time.

It should be noted that the optimization model of the regulation center of the multi-component power distribution network and the optimization model of the user side are the same model. The optimization model includes a calculation part of the user side and a calculation part of the regulation center of the multi-component power distribution network.

The optimization model in this embodiment is an optimization model of a multi-component power distribution network with a high proportion of distributed power sources, and the specific construction process is as follows:

First, assuming that the network topology of the multi-component power distribution network with a high proportion of distributed power sources has N+1 nodes, and these nodes can be represented as $N \cup \{0\}$, where N represents a node set defined as $\{1, \ldots, N\}$. A node 0 represents a node connected to an upper power distribution network. $V_i^t \in C$ represents the voltage of a node i at the time t, the value of the voltage is $v_i^t = |V_i^t|$, and the unit is V. At the time t, the distributed power source of the node i will inject active power and reactive power to the multi-component power distribution network, the injected active power and reactive power are respectively expressed as R and q: $\in$ R, and the units are KW and Kvar.

Photovoltaic capacity: a photovoltaic system has the maximum active power at the time t, the power is defined as $p_{i,av}^t$, and the unit is KW. The photovoltaic system also has an apparent rated capacity expressed by $\eta_i^t$, and the unit is KVA. The adjustable capacity range of photovoltaics at the time t can be expressed by a set $Z_i^t$:

$$Z_i^t = \{(p_i^t, q_i^t) | 0 \leq p_i^t \leq p_{i,av}^t, (p_i^t)^2 + (q_i^t)^2 \leq (\eta_i^t)^2\} \tag{1}$$

First, in the optimization of the multi-component power distribution network, the economic benefits of users need to be considered. Therefore, assuming that the economic cost of the user is $C_i^t(p_i^t, q_i^t)$ the optimization problem of the optimal economic benefit of the user side is as follows:

$$\min_{p_i^t, q_i^t} f_i^t(p_i^t, q_i^t \mid \alpha_i^t, \beta_i^t) = C_i^t(p_i^t, q_i^t) - \alpha_i^t p_i^t - \beta_i^t q_i^t, \quad (2)$$

$$\text{s.t. } (p_i^t, q_i^t) \in Z_i^t. \quad (3)$$

In the optimization model, $\alpha_i^t \in R$ and $\beta_i^t \in R$ represent regulation signals of the active power and reactive power generated by the regulation center of the multi-component power distribution network to the distributed power source of the user at the time t.

The optimal solution of the optimization problem of the optimal economic benefit of the user side is defined as:

$$\left(p_i^{t*}, q_i^{t*}\right) = b_i^t(\alpha_i^t, \beta_i^t) := \underset{(p_i^t, q_i^t) \in Z_i^t}{\arg\min} f_i^t(p_i^t, q_i^t \mid \alpha_i^t, \beta_i^t), \quad (4)$$

where $b_i^t$ and $f_i^t$ represent function symbols; and := represents the meaning of definition.

In addition to the economic cost of the user side, the optimization of the multi-component power distribution network also needs to consider the overall safety and stability of the network. $D^t(\hat{v}^t)$ represents the voltage level objective of the multi-component power distribution network, and the voltage deviation between the voltage of each node and the standard nominal voltage $v^{nom}$ (unit: V) is minimized, which can be expressed by a mathematical symbol: $D^t(\hat{v}^t) = \varepsilon \mathbf{1} \hat{v}^t - v^{nom} \varepsilon \mathbf{1} / 2$.

Based on the above assumption and definition, an optimization problem of the multi-component power distribution network with optimal comprehensive objectives, which can not only ensure the economic benefits of users, but also make the multi-component power distribution network operate safely and stably, can be constructed:

$$\min_{p_i^t, q_i^t, \alpha_i^t, \beta_i^t, \hat{v}^t} \sum_{i \in N} C_i^t(p_i^t, q_i^t) + \gamma^t D^t(\hat{v}^t), \quad (5)$$

$$\text{s.t. } \hat{v}^t = Rp^t + Xq^t + a, \quad (6)$$

$$\underline{v}^t \leq \hat{v}^t \leq \bar{v}^t, \quad (7)$$

$$(p_i^t, q_i^t) = b_i^t(\alpha_i^t, \beta_i^t) \; \forall \, i \in N, \quad (8)$$

where $\gamma^t \in R$, represents a coefficient of balance between the economic cost objective of the user and the voltage level objective of the multi-component power distribution network; $p^t$ and $q^t$ represent vectors composed of the active power and reactive power injected by all nodes, and the units are KW and Kvar; $\hat{v}^t$ represents a voltage level of the multi-component power distribution network; $\bar{v}^t$ and $\underline{v}^t$ represent the upper and lower limit requirements of the voltage level of the multi-component power distribution network, and the unit is V; and R and X represent coefficient matrixes corresponding to active power and reactive power in an approximate linearized power flow calculation formula of the multi-component power distribution network, and a represents a constant.

In this embodiment, regulation signals are formed into a regulation signal set $s_i^t = [\alpha_i^t, \beta_i^t]^T$, user loads $p_{i,l}^t$ and $q_{i,l}^t$ of each of the nodes are formed into a user load set $z_i^t = [p_{i,l}^t, q_{i,l}^t]^T$, and the units are KW and Kvar.

The above optimization problem can be solved by the Lagrange optimization algorithm. Since the iterative calculation process of the Lagrange multiplier method is a discretized and distributed solving process, a mode of collaborative calculation between the users and the regulation center of the multi-component power distribution network can be formed based on the Lagrange multiplier method. The calculation method is:

local calculation is performed by the user according to the received regulation signal $s_i^t = [\alpha_i^t, \beta_i^t]^T$, and the load (including active power and reactive power of distributed power sources) of the user is regulated. The calculation formula is:

Specifically, after the user receives a regulation signal $s_i^t(k)$, according to the current user load $z_i^t(k)$ and the economic cost $C_i^t(z_i^t(k))$ of a local user, the load is regulated by the following formula:

$$z_i^t(k+1) = z_i^t(k) - \varepsilon_1(\nabla_z C_i^t(z_i^t(k)) - s_i^t(k)) \quad (9),$$

where $(p_i^t \; q_i^t) \in Z$ should be ensured during calculation. In this embodiment, the symbol $\nabla$ represents a gradient, and the subscript thereof represents a corresponding variable when the gradient is calculated.

The regulation center of the multi-component power distribution network only needs to collect the voltage information of the user and calculate a regulation signal according to the collected voltage information. The calculation formulas are:

$$\underline{\mu}^t(k+1) = \underline{\mu}^t(k) + \varepsilon_2(\underline{v}^t - \underline{v}^t(k)), \quad (10)$$

$$\bar{\mu}^t(k+1) = \bar{\mu}^t(k) + \varepsilon_2(\hat{v}^t(k) - \bar{v}^t), \quad (11)$$

$$\alpha^t(k+1) = R\left(\underline{\mu}^t(k+1) - \bar{\mu}^t(k+1) - \gamma^t \nabla_{\hat{v}^t} D^t(\hat{v}^t(k))\right), \quad (12)$$

$$\beta^t(k+1) = X\left(\underline{\mu}^t(k+1) - \bar{\mu}^t(k+1) - \gamma^t \nabla_{\hat{v}^t} D^t(\hat{v}^t(k))\right), \quad (13)$$

where $\underline{\mu}^t(k+1) \geq 0$ and $\bar{\mu}^t(k+1) \geq 0$ should be ensured during calculation; $\varepsilon_1$ and $\varepsilon_2$ represent step sizes of the iterative calculation; $\underline{\mu}^t$ and $\bar{\mu}^t$ represent Lagrange multipliers corresponding to inequality constraints, which can be understood as intermediate variables required to calculate the regulation signal; and k represents the number of iterations in the algorithm calculation process. The stopping criterion of this algorithm is: a calculation result converges to a predefined range (for example: the difference between the two iterations before and after is less than a set threshold), or a maximum number of iterations preset before the calculation.

In this embodiment, in order to solve the problem of parameter setting in the optimization strategy of the multi-component power distribution network, a calculation framework of a PID-Lagrange optimization algorithm which is an improved algorithm combined with the control system theory is provided. The principle of the improved PID-Lagrange optimization algorithm is introduced as follows:

The optimization model that can be solved by this algorithm is:

$$P_{opt} \min_{x_r, r=1,2,\ldots,n} f(x), \quad (14)$$

$$\text{s.t. } h_i(x) = 0, \, i = 1, 2, \ldots, m, \quad (15)$$

$$g_j(x) \leq 0, \, j = 1, 2, \ldots, l, \quad (16)$$

where f(x) represents an objective function, $h_i(x)$ represents an equality constraint, and $g_i(x)$ represents an inequality constraint.

Assumption 1: the objective function $f(x)$ in the optimization model is a convex function; the equality constraint $h_i(x)$ is an affine function in the form of $h(x)=A^{(h)}x+B^{(h)}$, where $A^{(h)}=(a_{ij}^{(h)})_{m \times n}$, and $B^{(h)}=(b_1^{(h)}, b_2^{(h)}, \ldots, b_m^{(h)})^T$ is a matrix composed of constants and has at least one feasible solution; and the inequality constraint $g_j(x)$ is a convex function in the form of $g(x)=A^{(g)}x+B^{(g)}$, where $A^{(g)}=(a_{ij}^{(g)})_{l \times n}$, and $B^{(g)}=(b_1^{(g)}, b_2^{(g)}, \ldots, b_l^{(g)})^T$ is a matrix composed of constants.

Assumption 2: the objective function $f(x)$ and the constraint functions $h_i(x)$ and $g_j(x)$ are continuously derivable and have Lipschitz continuity.

Based on the assumption 1 and the assumption 2, the above optimization problem $P_{opt}$ has a unique optimal solution.

In this embodiment, the optimization problem $P_{opt}$ is solved by the Lagrange multiplier method, and a Lagrange function corresponding to the optimization problem is constructed first:

$$L(x, \lambda, \mu) = f(x) + \sum_{i=1}^{m} \lambda_i h_i(x) + \sum_{j=1}^{l} \mu_j g_j(x), \quad (17)$$

where $\lambda_i$ represents a Lagrange multiplier corresponding to an equality constraint $h_i(x)$, $\mu_j$ represents a Lagrange multiplier corresponding to an inequality constraint $g_j(x)$, and all Lagrange multipliers are written as vectors, represented by vectors $\lambda$ and $\mu$.

To solve the above Lagrange function, a numerical solving form can be generally used, and the calculation process is as follows:

$$x_r(k+1)=x_r(k)-\alpha_{x_n} \nabla_{x_n} L(x,\lambda,\mu)|_{x(k),\lambda(k),\mu(k)} r=1,2,\ldots,n \quad (18),$$

$$\lambda_i(k+1)=\lambda_i(k)+\alpha_{\lambda_i} \nabla_{\lambda_i} L(x,\lambda,\mu)|_{x(k+1)} i=1,2,\ldots,m \quad (19),$$

$$\mu_j(k+1)=[\mu_j(k)+\alpha_{\mu_j} \nabla L(x,\lambda,\mu)|_{x(k+1)}]_{R_+} j=1,2,\ldots,l \quad (20)$$

where $\alpha_{x_r}$, $\alpha_{\lambda_i}$ and $\alpha_{\mu_i}$ represent step size coefficients of the iterative calculation of the calculation algorithm. $R_+$ represents $\mu_j \geq 0$.

In this embodiment, by means of the relationship between the Lagrange iterative algorithm and the control system theory, a control method is used to control the calculation process. In this process, the KKT conditions representing the characteristics of the optimal solution are taken as control objectives, and the PID controller is used to control the calculation process so as to control the iterative calculation to continuously approach the optimal solution, thereby finally achieving the algorithm convergence.

In this control process, the control objectives are:

control objective 1 $\nabla_{x_r} L(x^*,\lambda^*,\mu^*)=0, r=1,2,\ldots,n$ (21), control objective 2 $h_i(x^*)=0, i=1,2,\ldots,m$ (22), control objective 3 $\mu_j^* g_j(x^*)=0, j=1,2,\ldots,l$ (23), constraint 1 $g_j(x^*) \leq 0, j=1,2,\ldots,l$ (24), constraint 2 $\mu_j^* \geq 0, j=1,2,\ldots,l$ (25), where the superscript * represents the optimal solution of the optimization model.

The PID control is a controller with errors as feedback quantities, so it is necessary to define the errors in the control process for three control objectives. The errors are respectively:

the error of the control objective 1:

$$e(k)_{\nabla_{x_r}}=0-\nabla_{x_r}L(x,\lambda,\mu)|_{x(k),\lambda(k),\mu(k)}=\nabla_{x_r}L(x,\lambda,\mu)|_{x(k),\lambda(k),\mu(k)} \quad (26);$$

the error of the control objective 2:

$$e(k)_{\nabla_{\lambda_i}=\nabla_{\lambda_i}L(x,\lambda,\mu)|_{x(k+1)}}-0=\nabla_{\lambda_i}L(x,\lambda,\mu)|_{x(k+1)}=h_i(x)|_{x(k+1)} \quad (27);$$

the error of the control objective 3:

$$e(k)_{\nabla_{\mu_i}=\nabla\mu_i L(x,\lambda,\mu)|_{x(k+1)}}-0=\nabla_{\mu_i}L(x,\lambda,\mu)|_{x(k+1)}=g_j(x)|_{x(k+1)} \quad (27);$$

Based on the three defined errors, in this embodiment, the PID controller is used to perform error control on the Lagrange iterative calculation process. The calculation algorithm is a discrete process, so a discretized PID incremental controller is required:

$$u(k+1)=u(k)+K_p \Delta e(k)+K_1 e(k)+K_D[\Delta e(k)-\Delta e(k-1)] \quad (29),$$

where $\Delta e(k)=e(k)-e(k-1)$, and u represents the output of the PID controller.

The discretized PID incremental controller is applied to the Lagrange iterative calculation process. This embodiment provides a PID-Lagrange algorithm, and the specific calculation iterative format is:

$$\begin{aligned}x_r(k+1)\big|_{r=1,2,\ldots,n} &= x_r(k)+\alpha_{x_r}^P\left(e(k)_{\nabla_{x_r}}-e(k-1)_{\nabla_{x_r}}\right) \\ &\quad +\alpha_{x_r}^I e(k)_{\nabla_{x_r}} \\ &\quad +\alpha_{x_r}^D\left(e(k)_{\nabla_{x_r}}-2e(k-1)_{\nabla_{x_r}}+e(k-2)_{\nabla_{x_r}}\right)\end{aligned} \quad (30)$$

$$\begin{aligned}\lambda_i(k+1)\big|_{i=1,2,\ldots,m} &= \lambda_i(k)+\alpha_{\lambda_i}^P\left(e(k)_{\nabla_{\lambda_i}}-e(k-1)_{\nabla_{\lambda_i}}\right) \\ &\quad +\alpha_{\lambda_i}^I e(k)_{\nabla_{\lambda_i}} \\ &\quad +\alpha_{\lambda_i}^D\left(e(k)_{\nabla_{\lambda_i}}-2e(k-1)_{\nabla_{\lambda_i}}+e(k-2)_{\nabla_{\lambda_i}}\right)\end{aligned} \quad (31)$$

$$\mu_j(k+1)_+\big|_{j=1,2,\ldots,l} = \begin{bmatrix} \mu_j(k)+\alpha_{\mu_j}^P\left(e(k)_{\nabla_{\mu_j}}-(k-1)_{\nabla_{\mu_j}}+\right. \\ \alpha_{\mu_j}^I e(k)_{\nabla_{\mu_j}}+ \\ \alpha_{\mu_j}^D\left(e(k)_{\nabla_{\mu_j}}-2e(k-1)_{\nabla_{\mu_j}}+e(k+2)_{\nabla_{\mu_j}}\right) \end{bmatrix}_+, \quad (32)$$

where the superscripts P, I and D corresponding to an iterative step size coefficient $\alpha$ respectively represent a proportional coefficient, an integral coefficient and a differential coefficient, and the subscripts $x_r$, $\lambda_i$, $\mu_j$ respectively represent action objects of the step size coefficient.

In the specific implementation, the PID-Lagrange algorithm is applied to the solution of the optimization problem of the multi-component power distribution network, so as to form an optimization algorithm based on the PID-Lagrange method to solve the problem of regulation of a high proportion of distributed power sources in the multi-component power distribution network. The calculation framework is:

local calculation is performed by the user according to the received regulation signal $s_i^t[\alpha_i^t, \beta_i^t]^T$, and the load (including active power and reactive power of distributed power sources) of the user is regulated. The calculation formula is:

after the user receives a regulation signal $s_i^t(k)$, according to the current user load $z_i^t(k)$ and the economic cost $C_i^t(z_i^t(k))$ of a local user, the load is regulated by the following formula:

$$z_i^t(k+1) = \tag{33}$$
$$z_i^t(k) - \varepsilon_{z_i^t}^P((\nabla_z C_i^t(z_i^t(k))) - s_i^t(k)) - (\nabla_z C_i^t(z_i^t(k-1)) - s_i^t(k-1)))$$
$$\varepsilon_{z_i^t}^I(\nabla_z C_i^t(z_i^t(k)) - s_i^t(k)) - \varepsilon_{z_i^t}^D((\nabla_z C_i^t(z_i^t(k)) - s_i^t(k)) -$$
$$2(\nabla_z C_i^t(z_i^t(k-1)) - s_i^t(k-1)) + (\nabla_z C_i^t(z_i^t(k-2)) - s_i^t(k-2)))),$$

where $(p_i^t, q_i^t) \in Z_i^t$ should be ensured during calculation.

The regulation center of the multi-component power distribution network only needs to collect the voltage information of the user and calculate a regulation signal according to the collected voltage information. Calculation formulas are:

$$\underline{\mu}^t(k+1) = \underline{\mu}^t(k) + \varepsilon_{\underline{\mu}^t}^P\left((\underline{v}^t - \hat{v}^t(k)) - (\underline{v}^t - \hat{v}^t(k-1))\right) + \tag{34}$$
$$\varepsilon_{\underline{\mu}^t}^I(\underline{v}^t - \hat{v}^t(k)) + \varepsilon_{\underline{\mu}^t}^D((\underline{v}^t - \hat{v}^t(k)) - 2(\underline{v}^t - \hat{v}^t(k-1)) + (\underline{v}^t - \hat{v}^t(k-2))),$$

$$\bar{\mu}^t(k+1) = \bar{\mu}^t(k) + \varepsilon_{\bar{\mu}^t}^P\left((\hat{v}^t(k) - \bar{v}^t) - (\hat{v}^t(k-1) - \bar{v}^t)\right) + \tag{35}$$
$$\varepsilon_{\bar{\mu}^t}^I(\hat{v}^t(k) - \bar{v}^t) + \varepsilon_{\bar{\mu}^t}^D((\hat{v}^t(k) - \bar{v}^t) - 2(\hat{v}^t(k-1) - \bar{v}^t) + (\hat{v}^t(k-2) - \bar{v}^t)),$$

$$\alpha^t(k+1) = R(\underline{\mu}^t(k+1) - \bar{\mu}^t(k+1) - \gamma^t \nabla_{\hat{v}^t} D^t(\hat{v}^t(k))), \tag{36}$$

$$\beta^t(k+1) = X(\underline{\mu}^t(k+1) - \bar{\mu}^t(k+1) - \gamma^t \nabla_{\hat{v}^t} D^t(\hat{v}^t(k))), \tag{37}$$

where $\underline{\mu}_i^t(k+1) \geq 0$ and $\bar{\mu}_i^t(k+1) \geq 0$ should be ensured during calculation;

represents a step size of the iterative calculation, the superscript represents the meaning of the PID controller in the control system theory corresponding to the coefficient, P represents proportional, I represents Integral, D represents Differential, and the subscript represents a calculation object that the coefficient acts on; $\underline{\mu}^t$ and $\bar{\mu}^t$ represent Lagrange multipliers corresponding to inequality constraints, which can be understood as intermediate variables required to calculate the regulation signal; and k represents the number of iterations in the algorithm calculation process. The stopping criterion of this algorithm is: a calculation result converges to a predefined range (for example: the difference between the two iterations before and after is less than a set threshold), or a maximum number of iterations preset before the calculation.

The method and system for collaborative regulation in this embodiment have the following advantages:

In this embodiment, the PID-Lagrange method is used to calculate the optimization model, so as to achieve the purposes of the minimum economic cost and the best user voltage level.

In this embodiment, the Lagrange method is used, and by means of the "distributed" characteristic of the iterative format, the calculation of the optimization model is divided into "a user side" and "a regulation center side of a multi-component power distribution network", where after the "user side" acquires the regulation signal calculated by the "regulation center of the multi-component power distribution network", local calculation is performed by Formula (33) to adjust the value of the local load. The function information of the economic cost of the user and numerical information of the local load of the user, included in Formula (33), are only known to the user, and are not transmitted to the regulation center of the multi-component power distribution network. Formulas (34) to (37) are the calculation contents of the regulation center of the multi-component power distribution network, where the information related to the user is only the voltage information of the user, and this information is public information and does not involve user privacy. Therefore, the algorithm in this embodiment has the characteristic of protecting user privacy and personal information. Moreover, the user side and the regulation center of the multi-component power distribution network calculate different contents respectively, the user side communicates with the regulation center of the multi-component power distribution network through the "voltage information", and the regulation center of the multi-component power distribution network communicates with the user side through the "regulation signal", thereby together completing the solution of the entire optimization model finally. Therefore, in the above calculation mode, the amount of information communication between the user side and the regulation center of the multi-component power distribution network is small, so that the regulation efficiency can be improved, the regulation cost can be saved, and the privacy and personal information of users can be protected.

In this embodiment, the calculation process of the above optimization model is regarded as a "control process" that starts from an initial value and finds an optimal value, and the PID controller in the control theory is used to control this process, thereby forming the PID-Lagrange algorithm. The PID-Lagrange algorithm has a clear parameter adjustment strategy, which is convenient for the user to adjust parameters according to different situations, so that the number of iterative calculation is reduced, and the calculation speed is increased.

The regulation signal is calculated by the improved PID-Lagrange algorithm, and the problem that the original Lagrange algorithm has no clear strategy for parameter adjustment can be solved and improved. Parameter adjustment methods can be as follows:

In this embodiment, the parameter adjustment is performed according to the actual meaning of the PID controller in the control system theory. Three parameters of the PID controller in the control system theory have clear control significance. The user can adjust the step size coefficient in the calculation process according to the control characteristics of the proportional, integral and differential controllers in the PID controller, so as to improve the calculation speed of the iterative calculation, so that the calculation of the optimization converges more quickly.

In other embodiments, the parameter adjustment can be performed according to a control analysis method. In addition to performing the parameter adjustment through the control significance of the parameters of the PID controller according to an empirical method, an analysis method of a control system in the control science can also be used to perform parameter adjustment in the calculation process.

In addition to using the controller in the control system theory to control the calculation process in this embodiment, analysis methods of a control process and a control system in the control science can also be used to analyze the convergence and calculation performance of the calculation process. For example, the Lyapunov stability criterion can be used to judge the convergence, providing guidance for the user to adjust appropriate parameters to achieve algorithm convergence. Furthermore, the iterative curve in the calculation process can also be analyzed according to methods such as a root-locus method, and better parameters can be selected to ensure that the algorithm has a faster calculation speed.

The following takes the actual data of a 33-node multi-component power distribution network in one day as an example for simulation to verify the performance advantages of the PID-Lagrange algorithm in this embodiment. The analysis is as follows:

Assuming that an objective function is:

$$\sum_{i \in N} 5(p_{i,max}^t - p_i^t)^2 + 3q_i^t + 0.5\|\tilde{v}^t - 1\|^2,$$

where $p_{i,max}^t$ represents the theoretical maximum power generated by the node i connected to the photovoltaics at the time t. The upper and lower limits of the voltage constraint are respectively: the lower limit $\underline{v}^t$ 0.95, and the upper limit $\overline{v}^t$ is 1.05. The original Lagrange algorithms (9) to (13) and the PID-Lagrange algorithms (33) to (37) in this embodiment are respectively used for calculation to compare and show the characteristics and advantages of the PID-Lagrange algorithm in this embodiment.

First, the calculation is performed at a single time section (that is, a specific time is selected) to verify the improvement of the calculation efficiency of the PID-Lagrange algorithm in this embodiment in one regulation process. The data of a 33-node multi-component power distribution network at 12:00 in one day is used for simulation.

The parameters of the original Lagrange algorithm are set as: $\varepsilon_1 = 0.05$, $\varepsilon_2 = 0.05$.

The parameters of the PID-Lagrange algorithm in this embodiment are set as:

$$\varepsilon_{z_i^t}^P = -0.05, \varepsilon_{z_i^t}^I = 0.05, \varepsilon_{z_i^t}^D = 0,$$

$$\varepsilon_{\mu^t}^P = 0, \varepsilon_{\mu^t}^I = 0.05, \varepsilon_{\mu^t}^D = 0,$$

$$\varepsilon_{\overline{\mu}^t}^P = -0.15, \varepsilon_{\overline{\mu}^t}^I = 0.05, \varepsilon_{\overline{\mu}^t}^D = 0.$$

The convergence judgment condition is: the difference between the objective functions of two iterations before and after is less than 0.0001.

Figure 3A:
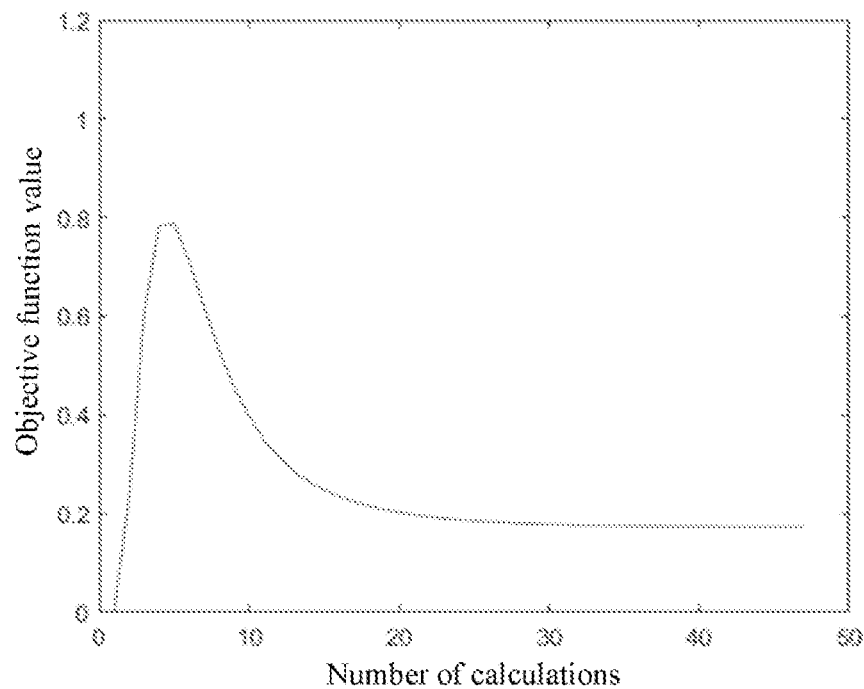
FIG. 3(a) is a schematic diagram showing an iterative curve and a number of calculations of an objective function calculated by an original Lagrange algorithm.
Figure 3B:
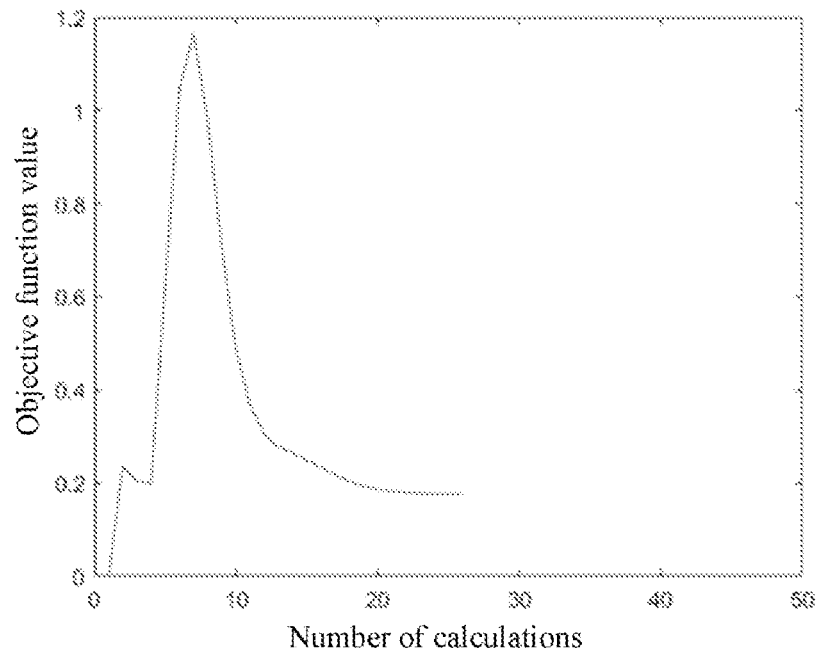
FIG. 3(b) is a schematic diagram showing an iterative curve and a number of calculations of an objective function calculated by a PID-Lagrange algorithm in this embodiment.

FIG. 3(a) and FIG. 3(b) illustrate that compared with the original Lagrange algorithm, the PID-Lagrange algorithm in this embodiment requires a fewer number of calculations for regulation in the selected regulation process. The number of calculations of the PID-Lagrange algorithm in this embodiment is 26, the number of calculations of the original Lagrange algorithm is 47, and the number of calculations is reduced by 21, which shows that the PID-Lagrange algorithm in this embodiment can increase the calculation speed. The reduction of the number of calculations also means that the number of communications between the users and the regulation center of the multi-component power distribution network is reduced, which shows that the PID-Lagrange algorithm in this embodiment can improve the regulation efficiency.

Secondly, the data from 10:00 to 14:10 (250 minutes in total) of the current day is used for calculation, and the numbers of calculations of all regulation processes during this period are compared. The regulation time interval is 30 s, and a total number of regulations is 500 times.

The parameters of the original Lagrange algorithm are set as: $\varepsilon_1 = 0.1$, $\varepsilon_2 = 0.1$.

The parameters of the PID-Lagrange algorithm in this embodiment are set as:

$$\varepsilon_{z_i^t}^P = -0.15, \varepsilon_{z_i^t}^I = 0.1, \varepsilon_{z_i^t}^D = 0,$$

$$\varepsilon_{\mu^t}^P = -0.2, \varepsilon_{\mu^t}^I = 0.1, \varepsilon_{\mu^t}^D = 0,$$

$$\varepsilon_{\overline{\mu}^t}^P = -0.2, \varepsilon_{\overline{\mu}^t}^I = 0.1, \varepsilon_{\overline{\mu}^t}^D = 0.$$

The convergence judgment condition is: the difference between the objective functions of two iterations before and after is less than 0.0001.

Figure 4A:
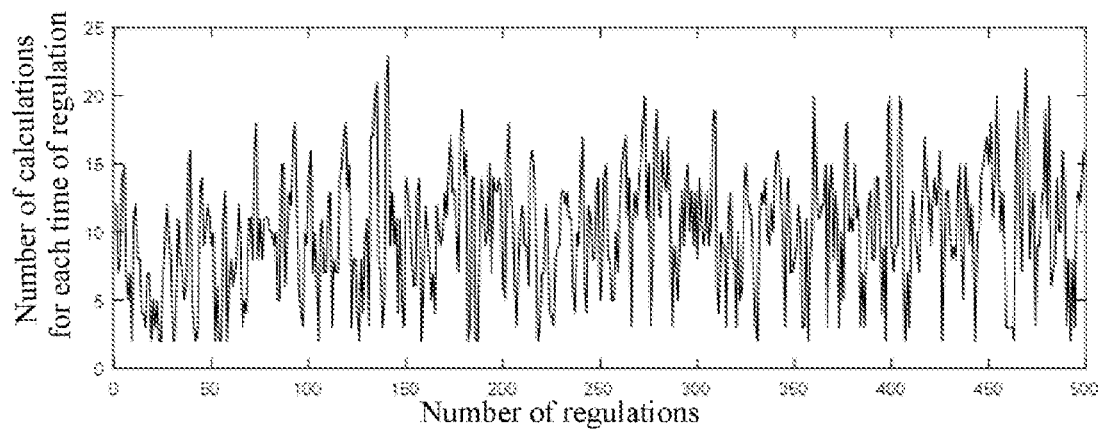
FIG. 4(a) is a schematic diagram of a number of calculations using the original Lagrange algorithm.
Figure 4B:
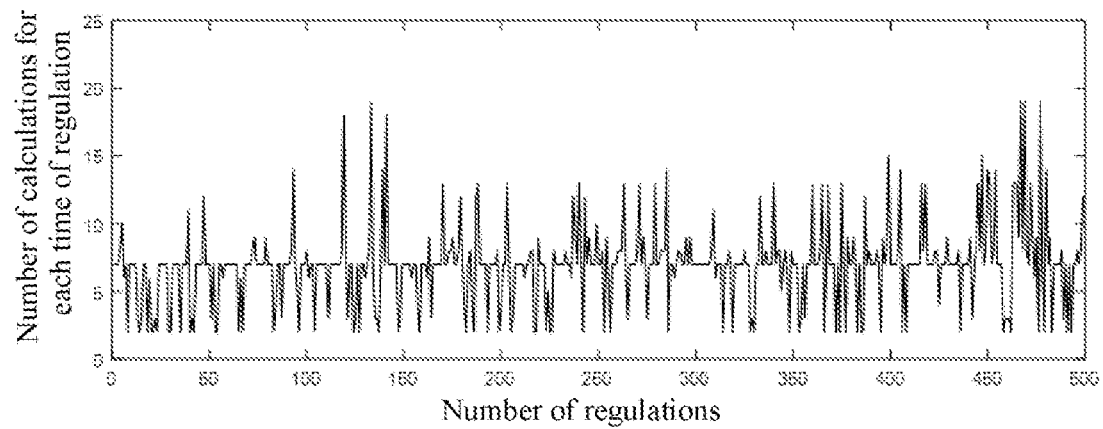
FIG. 4(b) is a schematic diagram of a number of calculations using the PID-Lagrange algorithm in this embodiment.

Calculation results are shown in FIG. 4(a) and FIG. 4(b). Compared with the original Lagrange algorithm, the PID-Lagrange algorithm in this embodiment requires a fewer number of calculations for each of 500 times of regulation. According to data statistics, in the above 500 times of regulation, the average number of calculations used by the PID-Lagrange algorithm in this embodiment for each time of regulation is 6.9198, and the number of calculations used by the original Lagrange algorithm is 9.9820. Compared with the original Lagrange algorithm, the PID-Lagrange algorithm in this embodiment reduces the average number of calculations used for each time of regulation by 30.68%. This shows that the PID-Lagrange algorithm in this embodiment can increase the calculation speed in the continuous regulation process in one day, which means that the number of information exchanges between the users and the regulation center of the multi-component power distribution network is reduced, thereby improving the regulation efficiency.

Embodiment 2

Figure 2:
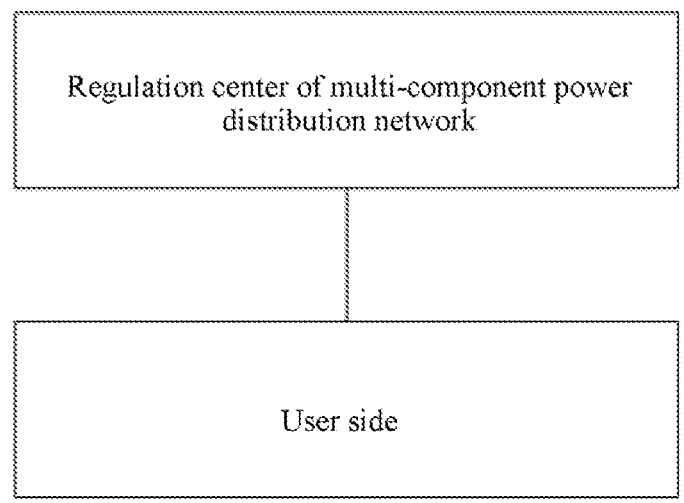
FIG. 2 is a schematic structural diagram of a system for collaborative regulation of a multi-component power distribution network with a high proportion of distributed power sources in an embodiment of the present invention.

Referring to FIG. 2, this embodiment provides a system for collaborative regulation of a multi-component power distribution network with a high proportion of distributed power sources, including a regulation center of the multi-component power distribution network and a user side, where the regulation center of the multi-component power distribution network is configured to:

acquire user voltage information;

based on the user voltage information and an optimization model including a calculation part of the user side and a calculation part of the regulation center of the multi-component power distribution network, perform iterative calculation of corresponding preset control objectives for the calculation part of the regulation center of the multi-component power distribution network in the optimization model by a Lagrange algorithm, simultaneously control errors of the corresponding preset control objectives in the iterative calculation process by a PID controller, so as to acquire a regulation signal of a local load of the user side, and send the regulation signal of the local load of the user side to the user side;

the user side is configured to:

perform iterative calculation of corresponding preset control objectives based on the regulation signal of the local load and the calculation part of the user side in the optimization model, and simultaneously control errors of the corresponding preset control objectives in the iterative calculation process by the PID controller, so as to regulate the local load to achieve the minimum economic cost and the minimum deviation between the voltage of the user side and the standard voltage of the multi-component power distribution network at the same time.

It should be noted that the specific implementation processes of the regulation center of the multi-component power distribution network and the user side in this embodiment correspond to the steps in Embodiment 1 one by one, and the specific implementation processes are the same and thus are not repeated here.

A person skilled in the art should understand that the embodiments of the present invention may be provided as a method, a system, or a computer program product. Therefore, the present invention may be in a form of hardware embodiments, software embodiments, or embodiments combining software and hardware. Moreover, the present invention may use a form of a computer program product that is implemented on one or more computer-usable storage media (including but not limited to a disk memory, an optical memory, and the like) that include computer-usable program code.

The present invention is described with reference to flowcharts and/or block diagrams of the method, device (system), and computer program product in the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided to a general-purpose computer, a dedicated computer, an embedded processor, or a processor of another programmable data processing apparatus to generate a machine, so that the instructions executed by the computer or the processor of the another programmable data processing apparatus generate an apparatus for implementing a specific function in one or more processes in the flowcharts and/or in one or more blocks in the block diagrams.

A person of ordinary skill in the art may understand that all or some of the procedures of the methods of the foregoing embodiments may be implemented by a computer program instructing relevant hardware. The program may be stored in a computer-readable storage medium. When the program is executed, the procedures of the foregoing method embodiments may be implemented. The foregoing storage medium may include a magnetic disc, an optical disc, a read-only memory (ROM), a random access memory (RAM), or the like.

The above descriptions are merely preferred embodiments of the present invention and are not intended to limit the present invention. A person skilled in the art may make various alterations and variations to the present invention. Any modification, equivalent replacement, or improvement made within the spirit and principle of the present invention shall fall within the protection scope of the present invention.

What is claimed is:

1. A method for collaborative regulation of a multi-component power distribution network with a high proportion of distributed power sources, comprising:

measuring, in real-time, a user voltage on a user side by a measuring apparatus mounted on the user side, and sending information of the measured user voltage to a regulation center of the multi-component power distribution network;

based on the information of the measured user voltage and an optimization model comprising a calculation part of a user side and a calculation part of the regulation center of the multi-component power distribution network, performing, by the regulation center of the multi-component power distribution network, a first iterative calculation process of corresponding preset control objectives for the calculation part of the regulation center of the multi-component power distribution network in the optimization model by a Lagrange algorithm, simultaneously controlling errors of the corresponding preset control objectives in the first iterative calculation process by a Proportional-Integral-Differential (PID) controller, and adjusting parameters of the PID controller of the regulation center to change a speed of the first iterative calculation according to different situations, to achieve convergence of the first iterative calculation process, so as to output and send a regulation signal of a local load of the user side to the user side;

performing, by the user side, a second iterative calculation process of corresponding preset control objectives based on the regulation signal of the local load of the user side and the calculation part of the user side in the optimization model, simultaneously controlling the errors of the corresponding preset control objectives in the second iterative calculation process by the PID controller, and adjusting parameters of the PID controller of the user side to change a speed of the second iterative calculation according to different situations, to achieve convergence of the second iterative calculation process, and output a load regulating physical value of the local load of the user side; and regulating the local load of the user side by a regulating apparatus to the load regulating physical value of the local load of the user side, so the multi-component power distribution network meets requirements of a minimum economic cost and a minimum deviation between the user voltage on the user side and a standard voltage at the same time; wherein the optimization model is:

$$\min_{p_i^t, q_i^t, \alpha_i^t, \beta_i^t, \hat{v}^t} \sum_{i \in N} C_i^t(p_i^t, q_i^t) + \gamma^t D^t(\hat{v}^t)$$

constraint conditions of the optimization model comprise:

$$\hat{v}^t = Rp^t + Xq^t + a$$

$$\underline{v}^t \leq \hat{v}^t \leq \overline{v}^t$$

$$(p_i^t, q_i^t) = b_i^t(\alpha_i^t, \beta_i^t) \ \forall \ i \in N,$$

$$b_i^t(\alpha_i^t, \beta_i^t) := \operatorname*{argmin}_{(p_i^t, q_i^t) \in Z_i^t} f_i^t(p_i^t, q_i^t | \alpha_i^t, \beta_i^t)$$

$$\min_{p_i^t, q_i^t} f_i^t(p_i^t, q_i^t | \alpha_i^t, \beta_i^t) = C_i^t(p_i^t, q_i^t) - \alpha_i^t p_i^t - \beta_i^t q_i^t$$

$$\text{s.t.} \ (p_i^t, q_i^t) \in Z_i^t$$

wherein $\gamma^t \in R_+$ represents a coefficient of balance between an economic cost objective of a user and a voltage level objective of the multi-component power distribution network; $\alpha_i^t$ and $\beta_i^t$ respectively represent regulation signals of the active power and reactive power generated by the regulation center of the multi-component power distribution network to a distributed power source of the user at a time t; $p_i^t$ and $q_i^t$ respectively represent that a distributed power source at a node i will inject active power and reactive power to the multi-component power distribution network at the time t; $p_i^t$ and $q_i^t$ represent vectors composed of the active power and reactive power injected by all nodes in the multi-component power distribution network; $\hat{v}^t$ represents a voltage level of the multi-component power distribution network; $C_i^t(p_i^t, q_i^t)$ represents the economic cost for the user side; $D^t(\hat{v}^t)$ represents the voltage level objective of the multi-component power distribution network; $\overline{v}^t$ and $\underline{v}^t$ represent upper and lower limit requirements of the voltage level of the multi-component power distribution network; R and X represent coefficient matrixes corresponding to active power and reactive power in an approximate linearized power flow calculation formula of the multi-component power distribution network, and a represents a constant; $b_i^t$ represents a function symbol; i represents a node of the multi-component power distribution network, and N represents a node set; $f_i^t$ represents a function symbol; :=represents the meaning of definition; $Z_i^t$ represents a user load set;

the load of the user is regulated, and a calculation formula is:

after the user receives a regulation signal $s_i^t(k)$, according to a current user load $z_i^t(k)$ and the economic cost $C_i^t(z_i^t(k))$ of a local user, the load is regulated by the following formula:

$z_i^t(k+1)=z_i^t(k)-\varepsilon_1(\nabla_z C_i^t(z_i^t(k))-s_i^t(k))$ wherein during calculation, $(p_i^t, q_i^t) \in Z_i^t$ is ensured, the symbol $\nabla$ represents a gradient, and subscripts represent corresponding variables when the gradient is calculated;

the regulation center of the multi-component power distribution network collects the user voltage information and calculates a regulation signal according to the collected voltage information and the calculation formulas are:

$\underline{\mu}^t(k+1) = \underline{\mu}^t(k) + \varepsilon_2(\underline{v}^t - \hat{v}^t(k))$ $\overline{\mu}^t(k+1) = \overline{\mu}^t(k) + \varepsilon_2(\hat{v}^t(k) - \overline{v}^t)$ $\alpha^t(k+1) = R(\underline{\mu}^t(k+1) - \overline{\mu}^t(k+1) - \gamma^t \nabla_{\hat{v}^t} D^t(\hat{v}^t(k)))$ $\beta^t(k+1) = X(\underline{\mu}^t(k+1) - \overline{\mu}^t(k+1) - \gamma^t \nabla_{\hat{v}^t} D^t(\hat{v}^t(k)))$ wherein during calculation, $\underline{\mu}^t(k+1)\geq 0$ and $\overline{\mu}^t(k+1)\geq 0$ are ensured; $\varepsilon_1$ and $\varepsilon_2$ represent step sizes of the iterative calculation; $\underline{\mu}^t$ and $\overline{\mu}^t$ represent Lagrange multipliers corresponding to inequality constraints; k represents a number of iterations in an algorithm calculation process;

in the process of controlling the errors of the corresponding preset control objectives in the iterative calculation process by the PID controller, the control objectives are:

| | |
|---|---|
| control objective 1 | $\nabla_{x_r}L(x^*,\lambda^*,\mu^*) = 0, r = 1,2,...,n$ |
| control objective 2 | $h_i(x^*) = 0, i = 1,2,...,m$ |
| control objective 3 | $\mu_j^* g_j(x^*) = 0, j = 1,2,...,l$ |
| constraint 1 | $g_j(x^*) \leq 0, j = 1,2,...,l$ |
| constraint 2 | $\mu_j^* \geq 0, j = 1,2,...,l$ | wherein the superscript * represents an optimal solution;

the PID controller defines the errors in the control process for three control objectives, and the errors are respectively:

the error of the control objective 1:

$e(k)_{\nabla_{x_r}}=0-\nabla_{x_r}L(x,\lambda,\mu)|_{x(k),\lambda(k),\mu(k)}=-\nabla_{x_r}L(x,\lambda,\mu)|_{x(k),\lambda(k)\mu(k)}$ the error of the control objective 2:

$e(k)_{\nabla_{\lambda_i}}=\nabla_{\lambda_i}L(x,\lambda,\mu)|_{x(k+1)}-0=\nabla_{\lambda_i}L(x,\lambda,\mu)|_{x(k+1)}=h_i(x)|_{x(k+1)}$ the error of the control objective 3:

$e(k)_{\nabla_{\mu_j}}=\nabla_{\mu_j}L(x,\lambda,\mu)|_{x(k+1)}-0=\nabla_{\mu_j}L(x,\lambda,\mu)|_{x(k+1)}=g_j(x)|_{x(k+1)}$ a Lagrange function corresponding to the optimization model is constructed:

$$L(x, \lambda, \mu) = f(x) + \sum_{i=1}^{m}\lambda_i h_i(x) + \sum_{j=1}^{l}\mu_j g_j(x)$$

wherein $\lambda_i$ represents a Lagrange multiplier corresponding to an equality constraint $h_i(x)$, $\mu_j$ represents a Lagrange multiplier corresponding to an inequality constraint $g_j(x)$, and all Lagrange multipliers are written as vectors, represented by vectors $\lambda$ and $\mu$; $f(x)$ represents an objective function; the subscripts $x_r$, $\lambda_i$, $\mu_j$ of the numerical symbol $\nabla$ represent corresponding variables when the gradient is calculated; and based on the three defined errors, an expression of a PID controller corresponding to the PID controller is:

$u(k+1)=u(k)+K_P\Delta e(k)+K_I e(k)+K_D[\Delta e(k)-\Delta e(k-1)]$ wherein $\Delta e(k)=e(k)-e(k-1)$, and u represents the output of the PID controller.

2. The method for collaborative regulation of the multi-component power distribution network with the high proportion of distributed power sources according to claim 1, wherein the local load comprises the active power and reactive power injected by the distributed power sources to the multi-component power distribution network.

3. The method for collaborative regulation of the multi-component power distribution network with the high proportion of distributed power sources according to claim 1, wherein the local load is regulated according to the regulation signal, the current user load, and the economic cost of the local user.

4. The method for collaborative regulation of the multi-component power distribution network with the high proportion of distributed power sources according to claim 1, wherein a stopping condition of the iterative calculation is:
a calculation result that converges to a predefined range.

5. The method for collaborative regulation of the multi-component power distribution network with the high proportion of distributed power sources according to claim 1, wherein a stopping condition of the iterative calculation is:
a maximum number of iterations preset before the calculation.

6. The method for collaborative regulation of the multi-component power distribution network with the high proportion of distributed power sources according to claim 1, wherein the local load comprises the active power and reactive power of the distributed power sources.

7. A system for collaborative regulation of a multi-component power distribution network with a high proportion of distributed power sources, comprising: a regulation center of the multi-component power distribution network, a user side, and a measuring apparatus and a regulating apparatus mounted on the user side, wherein the measuring apparatus is configured to measure and send user voltage on the user side in real-time to the regulation center of the multi-component power distribution network;

the regulation center of the multi-component power distribution network is configured to:

based on information of the measured user voltage and an optimization model comprising a calculation part of the user side and a calculation part of the regulation center of the multi-component power distribution network, perform a first iterative calculation process of corresponding preset control objectives for the calculation part of the regulation center of the multi-component power distribution network in the optimization model by a Lagrange algorithm, simultaneously control errors of the corresponding preset control objectives in the first iterative calculation process by a Proportional-Integral-Differential (PID) controller, so as to output and send a regulation signal of a local load of the user side to the user side;

the user side is configured to:

perform a second iterative calculation process of corresponding preset control objectives based on the regulation signal of the local load of the user side and the calculation part of the user side in the optimization model, and simultaneously control errors of the corresponding preset control objectives in the second iterative calculation process by the PID controller, so as to output a load regulating physical value of the local load of the user side; and the regulating apparatus is configured to regulate the local load of the user side to the load regulating physical value of the local load of the user side, so the multi-component power distribution network meets requirements of a minimum economic cost and a minimum deviation between the user voltage on the user side and a standard voltage at the same time; wherein, in the first and second iterative calculation process, parameters of the PID controller are adjusted to change speeds of the first and second iterative calculation according to different situations, to achieve convergence of the first and second iterative calculation process;

wherein, the optimization model is:

$$\min_{p_i^t, q_i^t, \alpha_i^t, \beta_i^t, \hat{v}^t} \sum_{i \in N} C_i^t(p_i^t, q_i^t) + \gamma^t D^t(\hat{v}^t)$$

constraint conditions of the optimization model comprise:

$$\hat{v}^t = Rp^t + Xq^t + a$$

$$\underline{v}^t \leq \hat{v}^t \leq \overline{v}^t$$

$$(p_i^t, q_i^t) = b_i^t(\alpha_i^t, \beta_i^t) \ \forall \ i \in N,$$

$$b_i^t(\alpha_i^t, \beta_i^t) := \underset{(p_i^t, q_i^t) \in Z_i^t}{\operatorname{argmin}} f_i^t(p_i^t, q_i^t \mid \alpha_i^t, \beta_i^t)$$

$$\min_{p_i^t, q_i^t} f_i^t(p_i^t, q_i^t \mid \alpha_i^t, \beta_i^t) = C_i^t(p_i^t, q_i^t) - \alpha_i^t p_i^t - \beta_i^t q_i^t$$

$$\text{s.t.} \ (p_i^t, q_i^t) \in Z_i^t$$

wherein $\gamma^t \in R_+$ represents a coefficient of balance between an economic cost objective of a user and a voltage level objective of the multi-component power distribution network; $\alpha_i^t$ and $\beta_i^t$ respectively represent regulation signals of the active power and reactive power generated by the regulation center of the multi-component power distribution network to a distributed power source of the user at a time t; $p_i^t$ and $q_i^t$ respectively represent that a distributed power source at a node i will inject active power and reactive power to the multi-component power distribution network at the time t; $p^t$ and $q^t$ represent vectors composed of the active power and reactive power injected by all nodes in the multi-component power distribution network; $\hat{v}^t$ represents a voltage level of the multi-component power distribution network; $C_i^t(p_i^t, q_i^t)$ represents the economic cost for the user side; $D^t(\hat{v}^t)$ represents the voltage level objective of the multi-component power distribution network; $\overline{v}^t$ and $\underline{v}^t$ represent upper and lower limit requirements of the voltage level of the multi-component power distribution network; R and X represent coefficient matrixes corresponding to active power and reactive power in an approximate linearized power flow calculation formula of the multi-component power distribution network, and a represents a constant; $b_i^t$ represents a function symbol; i represents a node of the multi-component power distribution network, and N represents a node set; $f_i^t$ represents a function symbol; :=represents the meaning of definition; $Z_i^t$ represents a user load set;

the load of the user is regulated, and a calculation formula is:

after the user receives a regulation signal $s_i^t(k)$, according to a current user load $z_i^t(k)$ and the economic cost $C_i^t(z_i^t(k))$ of a local user, the load is regulated by the following formula:

$$z_i^t(k+1) = z_i^t(k) - \varepsilon_1(\nabla_z C_i^t(z_i^t(k)) - s_i^t(k))$$

wherein during calculation, $(p_i^t, q_i^t) \in Z_i^t$ is ensured, the symbol $\nabla$ represents a gradient, and subscripts represent corresponding variables when the gradient is calculated;

the regulation center of the multi-component power distribution network collects the user voltage information and calculates a regulation signal according to the collected voltage information and the calculation formulas are:

$$\underline{\mu}^t(k+1) = \underline{\mu}^t(k) + \varepsilon_2(\underline{v}^t - \hat{v}^t(k))$$

$$\overline{\mu}^t(k+1) = \overline{\mu}^t(k) + \varepsilon_2(\hat{v}^t(k) - \overline{v}^t)$$

$$\alpha^t(k+1) = R(\underline{\mu}^t(k+1) - \overline{\mu}^t(k+1) - \gamma^t \nabla_{\hat{v}^t} D^t(\hat{v}^t(k)))$$

$$\beta^t(k+1) = X(\underline{\mu}^t(k+1) - \overline{\mu}^t(k+1) - \gamma^t \nabla_{\hat{v}^t} D(\hat{v}^t(k)))$$

wherein during calculation, $\underline{\mu}^t(k+1) \geq 0$ and $\overline{\mu}^t(k+1) \geq 0$ are ensured; $\varepsilon_1$ and $\varepsilon_2$ represent step sizes of the iterative calculation; $\underline{u}^t$ and $\overline{u}^t$ represent Lagrange multipliers corresponding to inequality constraints; k represents a number of iterations in an algorithm calculation process;

in the process of controlling the errors of the corresponding preset control objectives in the iterative calculation process by the PID controller, the control objectives are:

| | |
|---|---|
| control objective 1 | $\nabla_{x_r} L(x^*,\lambda^*,\mu^*) = 0, r = 1,2,...,n$ |
| control objective 2 | $h_i(x^*) = 0, i = 1,2,...,m$ |
| control objective 3 | $\mu_j^* g_j(x^*) = 0, j = 1,2,...,l$ |
| constraint 1 | $g_j(x^*) \leq 0, j = 1,2,...,l$ |
| constraint 2 | $\mu_j^* \geq 0, j = 1,2,...,l$ | wherein the superscript * represents an optimal solution;

the PID controller defines the errors in the control process for three control objectives, and the errors are respectively:

the error of the control objective 1:

$$e(k)_{\nabla_{x_r}} = 0 - \nabla_{x_r} L(x,\lambda,\mu)|_{x(k),\lambda(k),\mu(k)} = -\nabla_{x_r} L(x,\lambda,\mu)|_{x(k),\lambda(k),\mu(k)}$$

the error of the control objective 2:

$$e(k)_{\nabla_{\lambda_i}} = \nabla_{\lambda_i} L(x,\lambda,\mu)|_{x(k+1)} - 0 = \nabla_{\lambda_i} L(x,\lambda,\mu)|_{x(k+1)} = h_i(x)|_{x(k+1)}$$

the error of the control objective 3:

$$e(k)_{\nabla_{\mu_j}} = \nabla_{\mu_j} L(x,\lambda,\mu)|_{x(k+1)} - 0 = \nabla_{\mu_j} L(x,\lambda,\mu)|_{x(k+1)} = g_i(x)|_{x(k+1)}$$

a Lagrange function corresponding to the optimization model is constructed:

$$L(x, \lambda, \mu) = f(x) + \sum_{i=1}^{m} \lambda_i h_i(x) + \sum_{j=1}^{l} \mu_j g_j(x)$$

wherein $\lambda_i$ represents a Lagrange multiplier corresponding to an equality constraint $h_i(x)$, $\mu_j$ represents a Lagrange multiplier corresponding to an inequality constraint $g_j(x)$, and all Lagrange multipliers are written as vectors represented by vectors $\lambda$ and $\mu$; $f(x)$ represents an objective function; the subscripts $x_r$, $\lambda_i$, $\mu_j$ of the numerical symbol $\nabla$ represent corresponding variables when the gradient is calculated; and based on the three defined errors, an expression of a PID controller corresponding to the PID controller is:

$$u(k+1) = u(k) + K_p \Delta e(k) + K_I e(k) + K_D [\Delta e(k) - \Delta e(k-1)]$$

wherein $\Delta e(k) = e(k) - e(k-1)$, and u represents the output of the PID controller.

* * * * *